United States Patent [19]

Mourlon et al.

[11] 3,800,951
[45] *Apr. 2, 1974

[54] APPARATUS FOR REMOVING A SUBSTANCE FLOATING AS A LAYER ON THE SURFACE OF A BODY OF LIQUID

[75] Inventors: Jean-Claude Jacques Mourlon, Saint-Germain-en-Laye; Ernest Marie Rene Dubois, Sceaux, both of France

[73] Assignees: Bertin & Cie, Plasier; Entreprise de Recherches et d'Activites Petrolieres-Elf, Paris, both of, France

[*] Notice: The portion of the term of this patent subsequent to Jan. 18, 1989, has been disclaimed.

[22] Filed: Oct. 27, 1971

[21] Appl. No.: 192,845

Related U.S. Application Data

[63] Continuation of Ser. No. 887,297, Dec. 22, 1969, Pat. No. 3,635,342.

[30] Foreign Application Priority Data

Dec. 23, 1968   France .......................... 68.180117
Nov. 28, 1969  France ............................ 69.41273

[52] U.S. Cl. .......................... 210/242, 210/DIG. 21
[51] Int. Cl. ............................................ E02b 15/04
[58] Field of Search ......... 210/83, 84, 242, DIG. 21

[56] References Cited
UNITED STATES PATENTS
3,635,342  1/1972  Mourlon et al. ................... 210/242

*Primary Examiner*—Samih N. Zaharna
*Assistant Examiner*—T. A. Granger
*Attorney, Agent, or Firm*—A. W. Breiner

[57] ABSTRACT

An apparatus for removing from the surface of a body of liquid, an immiscible substance overfloating the same and spread thereover as a layer, said body of liquid and said layer of substance forming distinct horizontal strata, comprising:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer; and means, distinct from said whirling means, for discriminatingly extracting from said depression the immiscible substance accumulated therein, said extracting means including a portion adapted to engage a region of said depression located above the bottom of said depression.

36 Claims, 37 Drawing Figures

APPARATUS FOR REMOVING A SUBSTANCE FLOATING AS A LAYER ON THE SURFACE OF A BODY OF LIQUID

This is a continuation of our copending application Ser. No. 887,297 filed on Dec. 22, 1969, now U.S. Pat. No. 3,635,342.

This invention relates to a method and apparatus for removing from the surface of a body of liquid, an immiscible substance overfloating the same and spread thereover as a layer, said body of liquid and said substance forming distinct horizontal strata.

The said substance may be a liquid or, on occasion, a solid in the divided state, less dense than the liquid on which it is spread and not miscible with it. The invention may be applied with good advantage, but not exclusively, to the clearing of pollution from water contaminated by hydrocarbons, oil, crude petroleum or similar substances. In what follows, for the sake of simplicity the terms "water" and "hydrocarbon" will signify respectively the body of liquid and the substance floating on the surface of the said body of liquid, but it will be clear that the use of these terms is not intended to be of a restrictive nature.

At sea, in the vicinity of coast-lines, in ports, basins, lakes, watercourses, canals and in a general way for any body of liquid, the problem is frequently faced of clearing the surface of pollution. This clearance is all the more difficult to carry out in that the thickness of the polluting substance is minimal and in that the surface-area polluted is very considerable.

Known methods for recovering pollutants by a mechanical technique have generally proved of modest effectiveness and also burdensome, because of their low efficiency and the treatments that are required to separate the constituents of the mixture collected. As to chemical methods, they are themselves often a cause of secondary pollution.

The object of the invention is to provide a method and apparatus of high efficiency and modest recovery costs, and that substantially avoids the drawbacks set out above.

The method according to the invention comprises the steps of locally whirling said liquid in the vicinity of said surface about a substantially vertical axis to generate a whirlpool producing in said surface a depression of downwardly tapering closed bottom cup-shaped outline into which said immiscible overfloating substance is centripetally drawn from the environment of said depression and accumulates in extra thickness compared with said layer; discriminatingly extracting from said depression the substance accumulated therein, by extracting said substance from a region of said depression located at a distance above said closed bottom cup-shaped outline, and allowing free centripetal motion of said substance from said layer on the surface of said body of liquid towards said depression to feed the same and make up for the extracted amount.

The apparatus according to the invention essentially comprises means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer; and means, distinct from said whirling means, for discriminatingly extracting from said depression the immiscible substance accumulated therein, said extracting means including a portion adapted to engage a region of said depression located above the bottom of said depression.

Among the whirling means which may be employed there figure, more especially, mechanical means such as rotary impeller means, and fluid-injector means such as fluid-injecting nozzles, the positioning of these means, in accordance with the invention, being explained in detail hereinafter.

Certain arrangements of the invention more particularly relate to improvement in the conditions of circulation of a portion of the liquid in the body of liquid, more especially by virtue of the setting up for the said portion of a recirculating flow, possibly with an adjustable character, the said recirculating flow being facilitated by the presence of confining or guiding walls.

Other arrangements of the invention more particularly have a bearing on increasing the efficiency of the extraction of the immiscible substance by bringing into action suitable separating walls which render it possible to prevent interaction between the respective flows of the liquid undergoing recirculation and of the substance then being subjected to the extraction process.

The following description relating to the accompanying drawings, which is given by way of non-limitative example, will indicate how the invention may be carried into practice.

In the drawings:

FIG. 14 (Sheet IV) is a view in perspective of another embodiment of the apparatus according to the invention;

FIG. 15 (Sheet IV) is a diagrammatic fractional view, on a reduced scale, of a longitudinal section taken along the apparatus in FIG. 14;

FIG. 16 (Sheet IV) is a view in perspective of another embodiment of the apparatus according to the invention;

FIG. 21 (Sheet VI) is a diagrammatic view in perspective of an apparatus fitted with means to recirculate the liquid which correspond to another modified version;

FIG. 22 (Sheet VI) is a view similar to FIG. 17, showing, on the one hand, an improvement in the means for recirculating the liquid and, on the other hand, an improvement in the whirling means, involving fluid-injecting nozzles;

FIG. 22a (Sheet VI) is a section taken along the line XXIIa—XXIIa of the apparatus depicted in FIG. 22;

FIG. 23 (Sheet VI) is a view in elevation, partly in a section taken along the line XXIII—XXIII in FIG. 23a, of a device according to one modified version of the preceding apparatus;

FIG. 23a (Sheet VI) is a view of the apparatus depicted in FIG. 23 but in a section taken along the line XXIIIa—XXIIIa;

FIG. 32 (Sheet IX) is a diagrammatic view illustrating one particular embodiment of the fluid-injecting nozzles;

FIG. 33 (Sheet IX) is a view in section illustrating another embodiment of the whirling means; and FIG. 33a (Sheet IX) is a view of the device shown in FIG. 33 in a section taken along the line XXXIIIa—XXXIIIa.

The thickness of the thin layer of substance floating on the surface of a body of denser liquid has intentionally been reproduced in a rather exaggerated manner to provide a better understanding of the drawings. It can naturally be much thinner. Hereinafter the expression "vortex" will refer to the whirlpool generated by locally whirling the liquid about a substantially vertical axis (referred to hereinafter as the vortex axis) through means to be detailed hereinafter.

Figure 1:
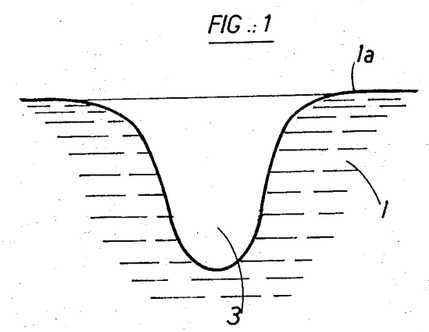
FIG. 1 (Sheet I) is a diagrammatic view of a depression created at the surface of a body of liquid by locally whirling the latter about a vertical axis.

In FIG. 1 is shown a depression 3 produced by a vortex at the free surface 1a of a body of liquid 1. The depression 3 has a downwardly tapering closed-bottom cup-shaped outline having substantially the form of a paraboloid of revolution about the vortex axis, which leads to the free surface 1a of the body of liquid 1 by an evolute surface with a slope decreasing progressively.

Figure 2:
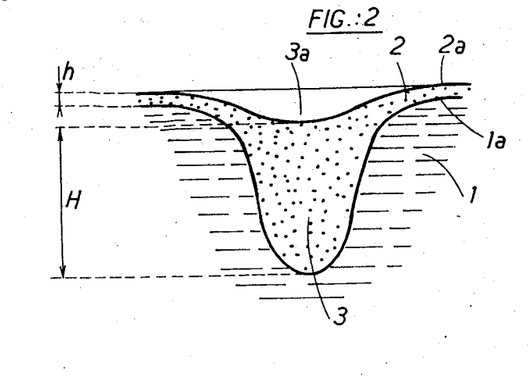
FIG. 2 (Sheet I) is a view similar to FIG. 1 but relating to the case in which the body of liquid is covered by a thin layer of an immiscible lighter substance.

In FIG. 2 may be seen a thin layer 2 of a substance less dense than the liquid and non-miscible with the latter, the said layer of substance and the body of liquid forming distinct horizontal strata. The lighter substance tends to fill the depression 3 produced by the vortex, in order thus to possess minimum potential energy. It is, on the other hand, set rotating about the vortex axis, but at an angular velocity smaller than that affecting the particles of liquid 1 for an identical distance from the said axis. The more viscous and lighter is the substance, the smaller will be the said velocity for a given velocity of the liquid at a given distance from the vortex axis. A stable balance is set up, in accordance with which a depression 3a is formed on the free surface 2a of the thin layer 2 of the substance, which depression is however far less deep than the depression 3. The thickness H of the volume of substance accumulated in the vortex zone is therefore very great in relation to the thickness h of the layer of substance outside said vortex zone. The substance may be a liquid substance, for example a hydrocarbon. It may also be a solid substance finely dispersed over the surface of the liquid 1.

Figures 3, 4:
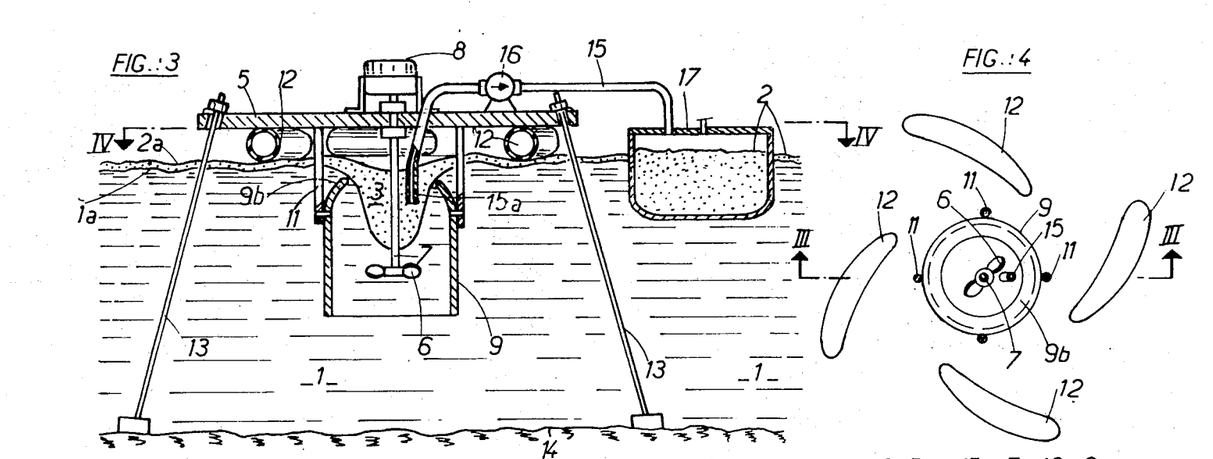
FIG. 3 (Sheet II) is a view, in section taken along the line III—III in FIG. 4, of one embodiment of apparatus according to the invention.
FIG. 4 (Sheet II) is a fractional view of a section taken along the line IV—IV in FIG. 3.

FIGS. 3 and 4 show a first embodiment of a substance-removing apparatus according to the invention.

Here may be seen a support or platform 5 maintained by floats 12 above the body of liquid 1, which body of liquid is itself supported on a bottom 14. The platform 5 is connected to the bottom 14 by an anchoring device 13, and it carries whirling means constituted, in the example shown here, by a screw impeller 6 mounted for rotation about a vertical axis.

The screw impeller 6, dipped down into the body of liquid 1 at a suitable distance from its free surface 1a, is driven by a motor 8, carried by the platform 5, through the agency of a shaft 7. The axis of the screw impeller 6 is identical, as will be appreciated, with the vortex axis.

The screw impeller 6 forcefully drives a portion of the liquid adjacent the depression 3, in a direction having a component substantially tangent to the cup-shaped outline of said depression, whereby said liquid portion is expelled away from said depression, by centrifugation with respect to said vortex axis. The screw impeller rotates in a direction such that it furthermore exerts a downward pull on said liquid portion. The screw impeller is coaxially surrounded by a fairing 9 connected to the platform 5 by means of rods 11. The fairing 9 is dipped completely in the body of liquid 1, and has a free upper edge 9b, which is preferably located in the vicinity of the free surface 1a of the said body of liquid 1 and is conveniently bent inwards, i.e., towards the vortex axis. The fairing 9 is open at its lower edge. A suction pipe 15a engages the space where it is desired to produce the depression 3. The pipe 15a is connected to a floating tank 17 by means of a pipe 15 associated with a suction pump 16 carried on the platform 5, the assembly 15a– 15–16 constituting, as can be seen, a means for discriminatingly extracting the substance 2 which has accumulated in the depression 3. It will be noted that the extracting means 15a–15–16 are distinct from the whirling means 6.

The shape of the floats 12 is preferably a curved one, and their arrangement is such that each float is located substantially according to a portion of a spiral about the vortex axis, so as to affect as little as possible the flow conditions around the vortex zone.

The area in which the substance-removing apparatus according to the invention is at work may be surrounded by protective devices (not shown) which are intended to improve the efficiency of the said apparatus within the said area; these are, for example, and without implying any limitation, immersed protective nets, floating barriers made up, for example, of buoys which surround, contain or collect the layer of substance 2 in one spot, and signalling devices. It is also possible to provide a system of immersed ducting surrounding the vortex at a suitable distance and emitting a curtain of bubbles so as to isolate a portion of the layer of light substance 2.

The operation of the above-described apparatus is as follows. The platform 5 is brought to the area requiring treatment, and is anchored. The motor 8 is started up, this turning the screw impeller 6. A vortex is thus created, this bringing about the formation of the depression 3. The light substance is centripetally drawn from the environment of said depression and accumulates in said depression. The suction pump 16 is started up and is adjusted to a suitable flow-rate, whereby the substance 2 accumulated in the depression 3 is discriminatingly extracted from said depression and then delivered to the tank 17. The amount of substance extracted from the depression 3 is immediately replaced by a corresponding amount from the thin layer 2, and the above-mentioned centripetal motion of the substance on the surface of the body of liquid towards said depression continues until the thin layer has been exhausted over a large surface-area around the vortex zone. It will be noted that the suction pipe 15a engages a region of the depression 3 located above the closed bottom cup-shaped outline of said depression, this ensuring that the extraction of the substance takes place without destroying said outline.

The fairing 9 makes it possible to limit the volume of liquid 1 set in motion, and consequently to limit the power of the motor. The curve of the upper edge 9b of the fairing 9 facilitates the free centripetal motion of the substnace 2 towards the depression 3.

Figure 5:
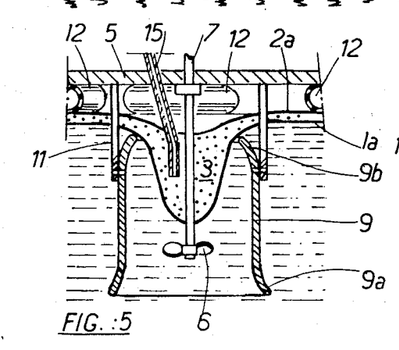
FIGS. 5, 6 and 7 (Sheet II) are fractional views, similar to that in FIG. 3, illustrating three modified embodiments respectively.
Figure 6:
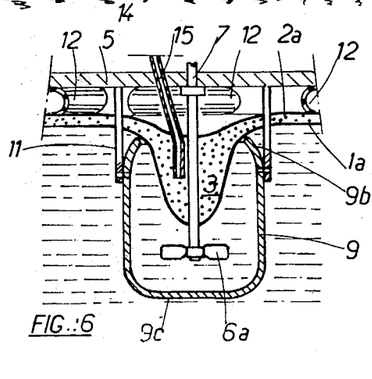
Figure 7:
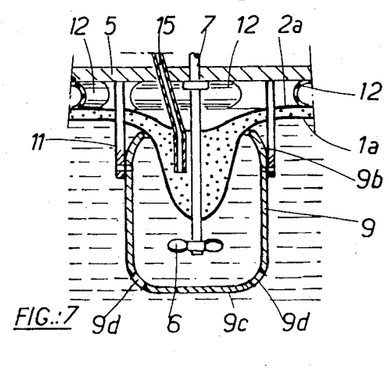

FIGS. 5 to 7 show modified embodiments of the fairing 9.

According to FIG. 5, the free lower edge 9a of the fairing 9 is bent out outwards, i.e., away from the vortex axis. This arrangement makes it possible to guide to good advantage the liquid flow emerging from said fairing.

According to FIG. 6, the fairing 9 is closed off by a substantially horizontal bottom surface 9c which makes it possible to limit the volume of liquid set in motion virtually to the volume of the said fairing. In this embodiment, the screw impeller is replaced by a bladed impeller wheel with flat blades 6a.

According to FIG. 7, the fairing 9 is pierced through the bottom wall 9c or in vicinity thereof by at least one orifice 9d.

Figures 8, 9, 10, 11:
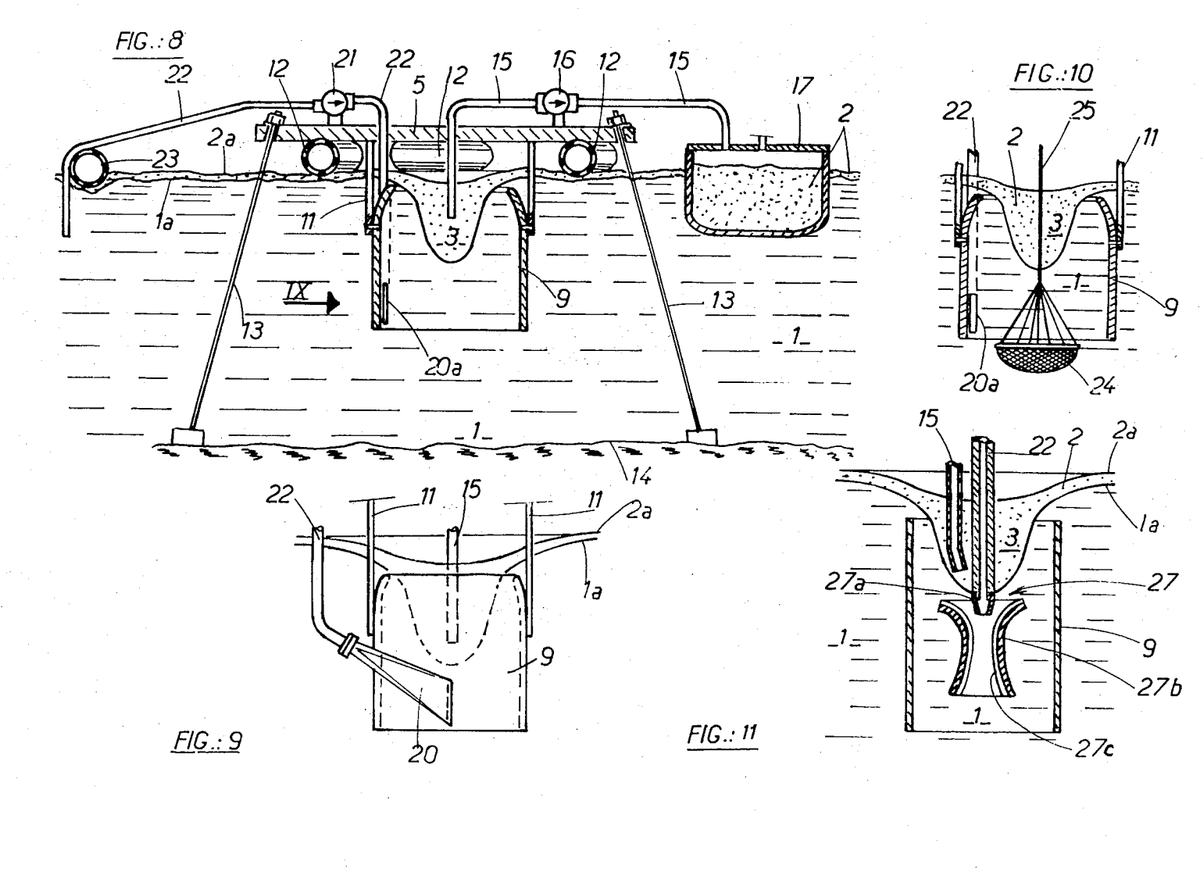
FIG. 8 (Sheet III) is a view in section of another embodiment of the apparatus according to the invention.
FIG. 9 (Sheet III) is a fractional view from outside following the arrow IX in FIG. 8.
FIGS. 10 and 11 (Sheet III) are fractional views, similar to that in FIG. 8, illustrating two modified embodiments respectively.

FIGS. 8 and 9 show another embodiment which differs from the preceding ones essentially through the fact that the whirling means here comprises, in place of the rotary impeller means 6 or 6a, a nozzle 20 which opens into the fairing 9 by way of a slot 20a and makes it possible to inject an impelling fluid tangentially to the wall of the said fairing. The axis of the nozzle is preferably slanted slightly downwards. The impelling fluid can to good advantage be made up of a liquid of the same nature as that of the body of liquid 1. With this end in view, in order to keep the said nozzle supplied, it is possible to provide a pipe 22 whose free upstream end, maintained at a distance from the platform by a float 23, dips down into the body of liquid 1. A pump 21 is interposed in the pipe 22. The nozzle 20 may also be connected to some other source of pressurised fluid.

The slot 20a extends parallel to the axis of the fairing 9 and substantially within the lower half of the latter. It may naturally extend over the entire height of the fairing. The extraction of the substance 2 is, as in the preceding case, ensured by means of the pipe 15 associated with the pump 16 and the tank 17.

When the pump 21 is started up, a jet of pressurised liquid 1 is delivered at a tangent inside the fairing 9 via the slot 20a, driving round the mass of liquid located within the fairing 9, and a vortex is formed.

FIG. 10 illustrates a modified embodiment of the extraction means for the light substance 2, applied to the case in which the substance 2 is made up of solid particles. A filtering unit 24, such as a net of very small mesh, linked with the platform 5 by a cable 25 is placed below the fairing 9, in the vicinity of and opposite to its lower free edge. Its dimensions are such that it can be shifted up inside the fairing 9. To pick up the particles of substance 2 accumulated in the depression 3, it is sufficient to raise the filtering unit 24 above said depression.

FIG. 11 shows diagrammatically a modified embodiment according to which a fluid-injecting nozzle 27a cooperates with a diffuser 27b of convergent-divergent configuration in such a way as to constitute a jet pump 27 arranged along the vertical axis of the fairing 9. The diffuser 27b is fitted on its inner wall with inclined or helical vanes 27c the inclination of which has a tangential component with respect to said axis. The nozzle 27a may be supplied with pressurised impelling fluid, through the agency of a pipe 22, by means of a pump similar to the pump 21 shown in FIG. 8. It may also be connected to some other source of pressurised fluid. In operation, the whirling effect brought about by the vanes 27c leads to the formation of a vortex, hence the depression 3. The upper edge of the fairing 9 shown in FIG. 11 is straight, and is not bent inwards.

Figure 12:
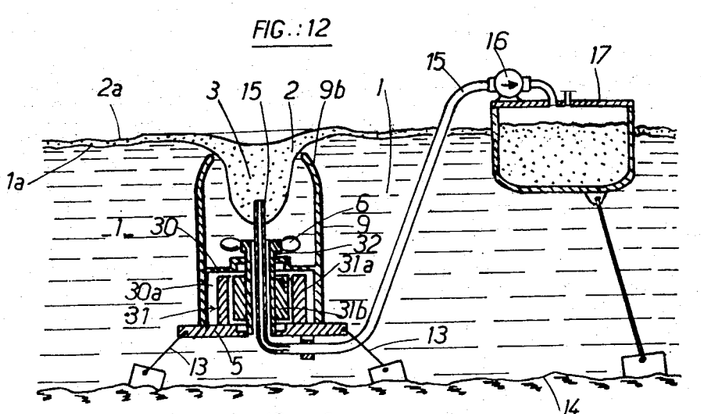
FIG. 12 (Sheet I) is a view in section of another embodiment of the apparatus according to the invention.

In the embodiment shown in FIG. 12, the support or platform 5 is immersed in the liquid 1 and is connected to the bottom 14 by the anchoring device 13. The fairing 9 is fastened above the platform 5, and the upper free edge 9b of the said fairing is located in the vicinity of the surface 1a. A horizontal partition 30 makes is possible to form, along with the platform 5 and the fairing 9, a fluid-tight chamber 30a inside the lower part of the said fairing. A motor 31 placed inside the chamber 30a includes a stator 31a and a rotor 31b. A hollow shaft 32, rigid with the rotor 31b, passes through the partition 30 in a fluid-tight manner, and projects into the space located above the chamber 30a. Its free end carries a screw impeller 6. The pipe 15 for carrying away the light substance is placed inside the shaft 32 and opens into the depression 3. It is connected with the tank 17 and with the pump 16, which in this embodiment is carried on the tank.

Figure 13:
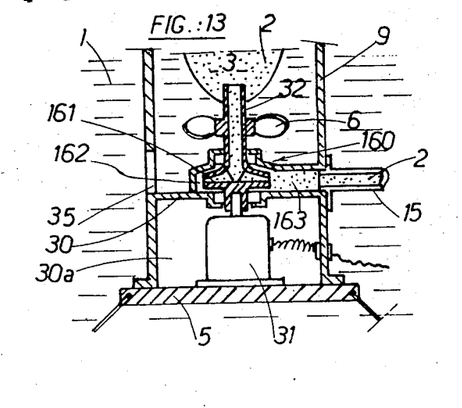
FIG. 13 (Sheet I) is a fractional view, similar but on a larger scale, illustrating a modified embodiment.

FIG. 13 shows a modified embodiment in which the hollow shaft 32 is employed simultaneously to drive the impeller 6 and the rotor 161 of a centrifugal substance-extracting pump 160. The shaft 32 is driven by the motor 31 placed in the fluid-tight chamber 30a. It is extended as far as the depression 3, so as to serve as an intake pipe for the pump 160. The rotor 161 turns inside a diffusion chamber 162 which feeds a delivery pipe 163 from the pump. The pipe 15 directly links the pipe 163 and the tank 17 (not shown in FIG. 13). An orifice 35 is formed in the lateral wall of the fairing 9 in the vicinity of the horizontal partition 30, so as to put the interior of the said fairing in communication with the liquid mass 1 situated outside the latter.

FIGS. 14 and 15 show a further embodiment of the apparatus according to the invention. In this embodiment, the platform is replaced by a boat 36 of "Catamaran" type, the two hulls 36a and 36b of which are interconnected by a structure 36c. Said hulls are also interconnected, at the prow of the boat, by a cylindral paddle-wheel 37 with paddles 37a, which is adapted to rotate about a horizontal axis. A gantry 38 situated between the wheel 37 and the structure 36c and rigid with the hulls 36a and 36b supports the motor 8. As in the first embodiment, this motor drives, by means of the shaft 7, the screw impeller 6 which is immersed between said hulls. The fairing 9 surrounding the impeller 6 is connected to the hulls 36a and 36b by fastening devices 39. The substance-extraction pipe 15 is connected to the tank 17 by means of a suction pump (not shown).

Operation is as follows:

The boat 36 proceeds in the direction shown by the arrow F into the area requiring treatment. The paddle-wheel 37 turns in the direction shown by the arrow $f$ because of the resistance to the advancing movement put up by the body of liquid 1 and the layer 2. The layer 2 is able to penetrate into the limited area bounded by the hulls 36a, 36b, the wheel 37 and the structure 36c, but cannot escape therefrom. The substance 2 therefore accumulates there. When the amount of substance 2 preaccumulated in this way is sufficiently large, the boat 36 is stopped and the motor 8 along with the suction pump is rendered operative, so as to despatch the substance 2 into the tank 17, as has already been described hereinbefore. The boat can in this way be shifted across all the area requiring treatment.

In the embodiment described in FIG. 16, a support 41 associated with floats 42 is drawn along by a boat 43. Said support is adapted to carry a plurality of units, each of which comprises the combination of whirling means and extraction means described hereinbefore. For example, four screw impellers 6 are provided each of which is driven by a respective motor 8 by means of a respective shaft 7. Two consecutive shafts rotate in opposite directions. Each impeller 6 is associated with a fairing 9 and with an extraction pipe 15 connected to manifolds 44 which open into tanks 17 carried by the boat 43. Each tank is fitted with a suction pump (not shown). This arrangement has the advantage that it operates without stopping the boat, the latter proceeding very slowly in the area requiring treatment. Naturally, any number whatever of impellers 6 may be used.

Figure 17:
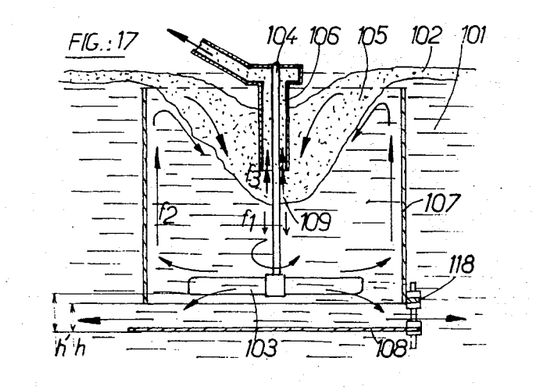
FIG. 17 (Sheet V) shows diagrammatically in elevation a section through an apparatus according to the invention, more especially demonstrating the setting up of a recirculating flow in the body of liquid.

In FIG. 17, the reference number 101 has been used to designate the body of liquid, so-called "water," covered over by a thin layer 102 of a substance called "hydrocarbon."

Whirling means, comprising, for example, a screw impeller 103 or a flat blade driven round by a shaft 104, make it possible to bring about, in the body of liquid, the formation of a vortex with a downward pull on a liquid portion, shown diagrammatically by the arrows $f_1$. In operation, on the surface of the water there forms a depression 105 in which the hydrocarbon accumulates with a thickness much greater than that of the thin layer 102, this feature facilitating, as already explained, its extraction, for example by suction, by way of a pipe 106 surrounding the shaft 104.

A fairing 107 laterally surrounds the whirling means 104, and on the other hand, below the said whirling means and preferably below the said fairing, there is provided a bottom wall 108 which forms a generally horizontal surface. By this means, around the whirling means 103 there is defined a certain enclosed space in which at least a part of the liquid portion which is forcefully driven by the whirling means and expelled away from the depression 105, is recovered on its expulsion path and rediverted towards said depression. Said recovering step is effected at a lower level, and said rediverting step is effected at an upper level, whereby a recirculating flow of liquid is established in the body of liquid in the vicinity of the depression 105, in a direction with respect thereto successively outward, upward and inward, as shown by the arrows $f_1$–$f_2$.

The existence of this recirculation is, in principle, favourable to the efficiency of the apparatus because, other things being equal, it renders it possible to decrease the power of the whirling means 103. The wall 108 is arranged at a distance $h$ from the lower free edge of the fairing 107 and at a distance $h'$ below the whirling means 103. The distances $h$ and $h'$ may be adjusted by means such as a threaded rod 118, this making it possible, while taking account in particular of the characteristics of the substances then present and more especially of their respective densities (on which depend the geometrical and hydrodynamic characteristics of the vortex depression 105), to modify the rate of recirculation of the denser liquid.

Figure 18:
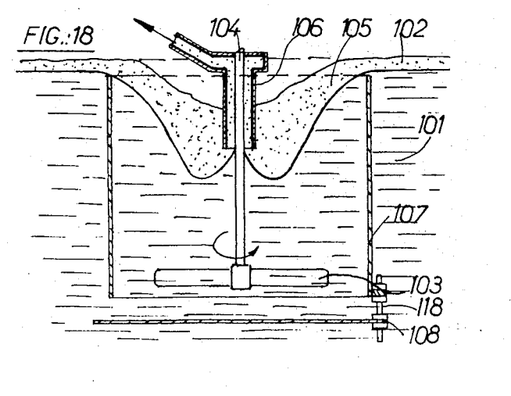
FIG. 18 (Sheet V) is a complementary diagram explaining FIG. 17.

The arrangement shown in FIG. 17 may nevertheless have some drawbacks when the extraction of the hydrocarbon is proceeded with. There then occurs at the intake to the suction pipe 106 a flow $f_3$ contrary in direction to the flow $f_1$, this running the risk of giving rise, in an area 109 included between the bottom of the depression 105 and the intake to the suction pipe 106, to an interaction between the two flows that entails certain losses. Apart from this, and as FIG. 18 demonstrates, the action of the whirling means 103 may be counteracted by a action in a contrary direction due to the relative underpressure prevailing at the intake to the suction pipe 106, which may, put briefly, lead to inopportune extractions of water along the said pipe.

Figure 19:
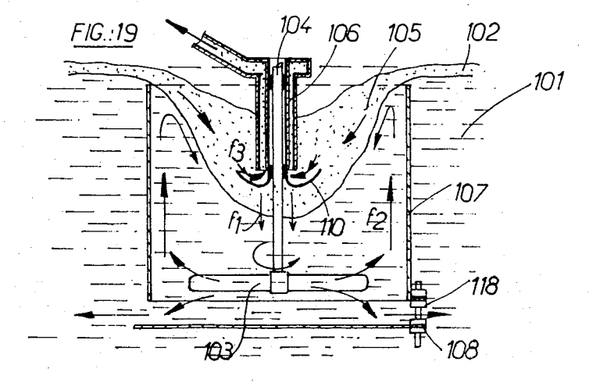
FIGS. 19 and 20 (Sheet V) are views similar to FIG. 17 and showing, in particular, according to two modified versions, means rendering it possible to decrease interactions between, on the one hand, the said recirculation and, on the other hand, the extraction process relating to the substance accumulated in the depression formed at the surface.

FIG. 19 shows a simple arrangement which renders it possible to a large extent to obviate the drawback mentioned above; according to this arrangement a separating wall 110, which is advantageously in the form of a cup substantially parallel to the bottom of the depression 105, is mounted between the bottom of said depression and the intake opening of the suction pipe 106. The said cup-shaped separating wall guides the flow $f_3$ of hydrocarbon, which no longer interferes with the recirculation flow $f_1$, $f_2$, and also makes it possible to eliminate the above mentioned counter-action.

Figure 20:
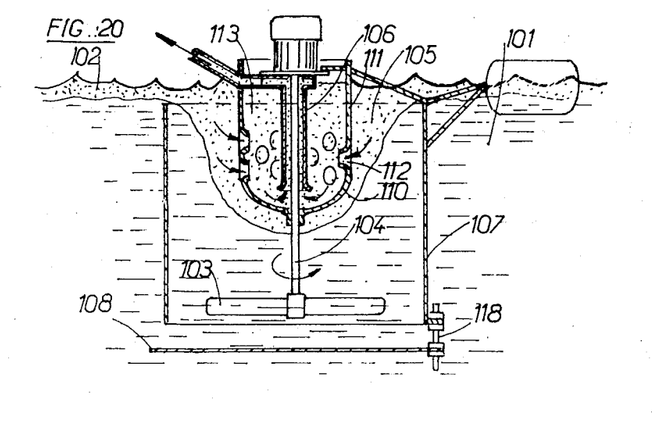

FIG. 20 relates to a modified version of the preceding arrangement, according to which the cup 110 is continued upwards by an auxiliary lateral wall 111 which preferably crosses the hydrocarbon/air interface and is pierced with orifices 112 for the passage of the hydrocarbon. In the heart of the depression 105 there is therefore confined a settling chamber 113 in which any possible swirling movement of the hydrocarbon is mullified or greatly reduced, this leading to an increase in the efficiency of the extracting step of the hydrocarbon. Apart from this, the wall 111 forms a screen against agitating surface movements which might have the effect of bringing about a vertical displacement of the depression 105 and consequently, on certain occasions, an inopportune extraction of water.

FIG. 21 relates to a modified version of the invention, according to which the above-mentioned recirculation is favoured by the presence of a convex deflecting wall 114 which is adapted to cause at least a part of the portion $f_1$ of liquid to deviate. As is known, a flow a fluid along a convex wall tends to "stick" to said wall, this phenomenon being sometimes called the "Young effect." The convex wall 114 may advantageously form part of a surface of revolution, such as a toroidal surface, which surrounds the whirling means 103 and the geometrical axis of which is identical with the vortex axis.

FIGS. 22 to 32 relate to various improvements concerning the whirling means, in the case in which these latter comprise nozzles intended for the injection of suitably oriented jets of a pressurised impelling fluid into the mass of water.

In FIGS. 22 and 22a are shown a plurality of fluid-injecting nozzles 115 distributed in a circle around a substantially vertical axis Y—Y which is identical with the vortex axis. The nozzles 115 open into a space bounded, as in the case of FIGS. 1 to 4, by a lateral fairing 107 and a generally horizontal bottom wall 108. The latter is, as already explained, arranged at adjustable distances $h$ from the lower free edge of the fairing, and $h'$ from the whirling means 115.

The fluid-injecting nozzles 115 are carried by and fed from a hollow manifold structure 116 having a geometrical axis which is identical with the vortex axis. Said hollow structure is immersed in the body of liquid, centrally of the fairing 107, and supplied with pressurised impelling fluid from a supply pipe 117. The fluid-injecting nozzles 115 are made to point in such a way that the jets they emit possess a tangential component with respect to the vortex axis and, in certain cases, also a vertical component directed downwards. In the heart of the body of water 101 these jets induce a swirling motion with a downward pull on the water. A depression 103 is thus formed, wherein the hydrocarbon accumulates.

FIGS. 23 and 23a show a modified embodiment which only differs from the preceding one through the fact that the central hollow manifold structure 116 is replaced by a peripheral manifold structure 119 into which there opens a supply pipe 120. The pipe 120 points in a direction having a tangential component with respect to the vortex axis. The impelling fluid thus possesses since its entry into the nozzles, the desired tangential component.

FIGS. 24 to 31 relate to embodiments of whirling means, according to which a plurality of fluid-injecting nozzles are distributed over one or more coaxial circles of a surface of revolution the axis of which is substantially vertical and is identical with the vortex axis.

According to FIGS. 24 to 28, the said surface of revolution 121 is toroidal, similar to the surface 114 shown in FIG. 21, but which is hollow inside, so as to bound a manifold chamber 122 which communicates with a source of pressurised impelling fluid which is not shown.

Figure 24:
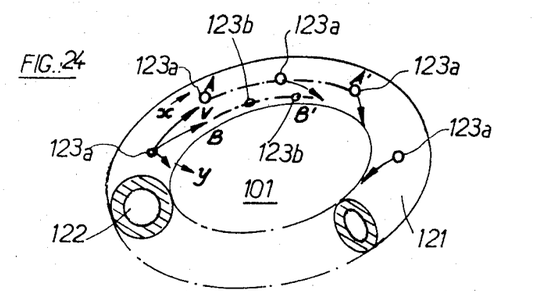
FIG. 24 (Sheet VII) is a diagrammatic view in perspective illustrating another arrangement of the fluid-injecting nozzles.
Figure 25:
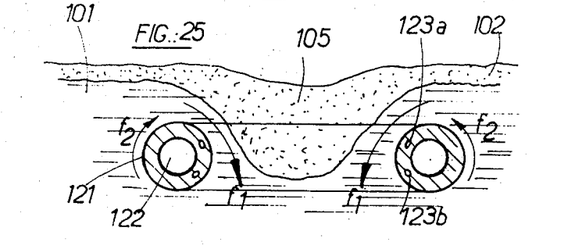
FIG. 25 (Sheet VII) is a view in elevation showing in section the device depicted in FIG. 24.

With a distribution over one or more coaxial circles AA', BB', etc., through the wall of the torus have been drilled a number of inclined passages, such as those at 123a, 123b, etc.., forming nozzles for the injection of impelling fluid. Each of said nozzles points in a direction V having a tangential component "$x$" with respect to the vortex axis, and also a vertical downward component "$y$." The jets of impelling fluid escaping from the said nozzles thus induce in the heart of the body of water a general spiralling movement from the upper part towards the lower part of the torus, as the arrows $f_1$ indicate, so bringing about the formation of the hydrocarbon-accumulating depression 105. As shown in FIG. 24, the nozzles are offset, in relation to each other, passing from one circle AA' to the following one BB'.

Figure 26:
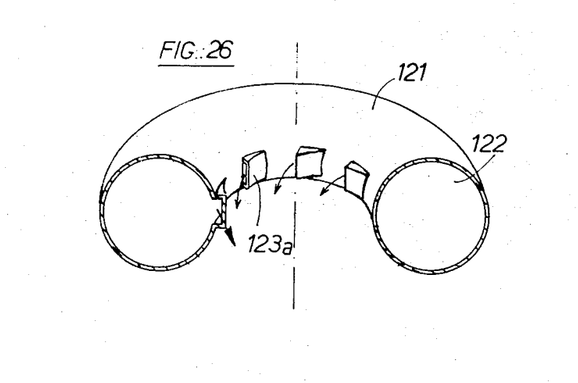
FIG. 26 (Sheet VIII) is a diagrammatic view in perspective, similar to FIG. 24 and showing a modified version.
Figure 27:
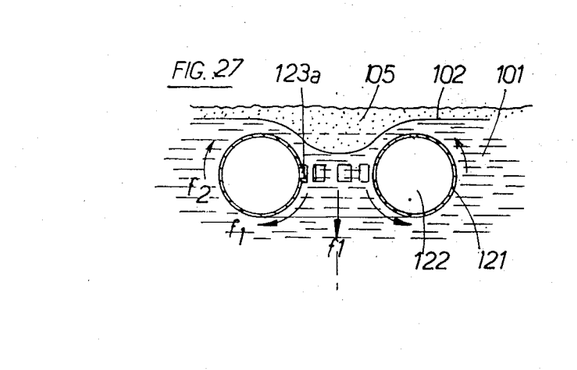
FIG. 27 (Sheet VIII) is a view in vertical section of the device depicted in FIG. 26.
Figures 28, 28A:
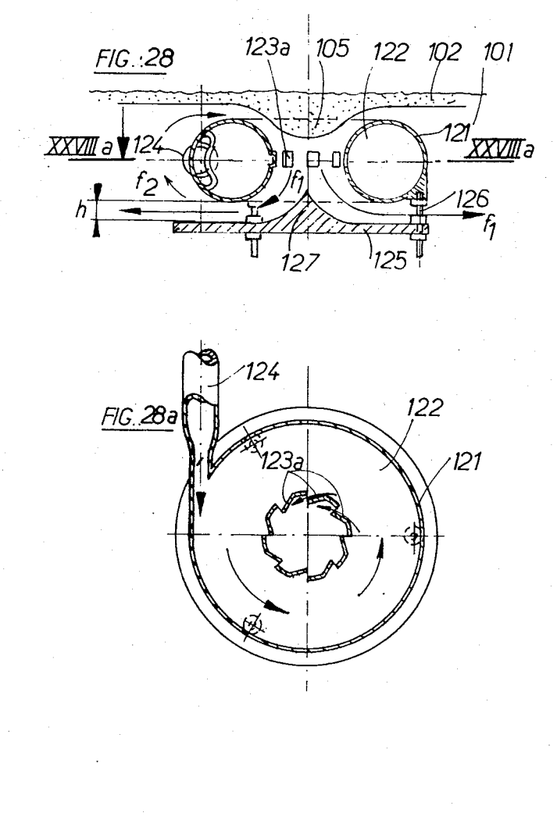
FIG. 28 (Sheet VIII) is a view in vertical section similar to FIG. 27 and depicting a further modified version.
FIG. 28a (Sheet VIII) is a view of the device depicted in FIG. 28 but in a section taken along the line XXVIIIa—XXVIIIa.

FIGS. 26 to 28 show a modified embodiment of the whirling means differing from those just described essentially through the fact that, since the wall of the manifold structure is relatively thin, the nozzles, such as the one at 123a, are made up of a system of slots formed in the said wall and deformed so as to give the desired orientation to the jets of impelling fluid.

According to FIGS. 28 and 28a; the manifold chamber 122 inside the torus 121 is supplied with pressurised impelling fluid through a pipe 124 which opens tangentially into the said space, so that, as in the case of FIGS. 23 and 23a, the impelling fluid already has, at the entry to the nozzles 123a, the tangential component desired.

Apart from this, in the case of FIG. 28 the presence will be noted of a bottom wall 125 arranged below the torus 121 at a distance "$h$" from the latter, said distance being adjustable with the assistance of means 126 similar to the means 118 described above. The said bottom wall, which is substantially parallel to the horizontal plane of symmetry of the torus, possesses along its median portion a prominence 127 which promotes the guidance of the portion $f_1$ of the liquid. As in the preceding instance, the rate of recirculation $f_1$–$f_2$ may be changed by adjusting the distance "$h$."

Figure 29:
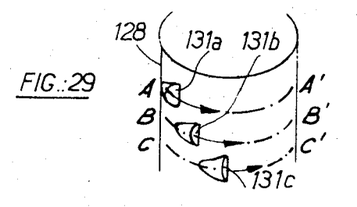
FIG. 29 (Sheet VII) is a diagrammatic view showing another arrangement of the fluid-injecting nozzles.
Figure 30:
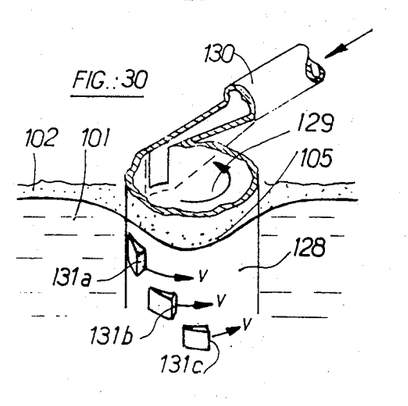
FIGS. 30 and 31 (Sheet VII) are views in perspective of two modified embodiments of the arrangement shown in FIG. 29.
Figure 31:
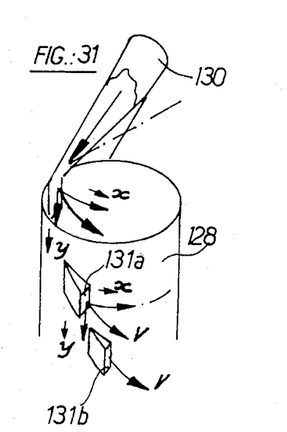

FIGS. 29 to 31 relate to a modified version, according to which the surface of revolution carrying the fluid-injecting nozzles is a hollow cylinder 128 with a substantially vertical axis, said axis being identical with the vortex axis. The space within the said cylinder, denoted by the reference numeral 129, forms a manifold chamber which is supplied with pressurised impelling fluid via a pipe 130 which opens tangentially into the said space. The nozzles, which are of the type described in respect of FIGS. 26 and 27, have been designated by the reference numerals 131a, 131b, 131c. As will be seen, these nozzles are distributed along several circles AA', BB', CC', etc.., and are offset in relation to each other, passing from one circle to the following one.

In every case, the nozzles 131a, 131b, 131c, etc.., and the pipe 130 are arranged to point in a direction having a tangential component and, where such applies, a vertical component pointing downwards, as is shown in particular in FIG. 31.

The jets of impelling fluid escaping from the nozzles impart to a portion of the body of water a spiralling movement which is all the more stable, the more the liquid portion set rotating tends to "stick" to the convex wall of the cylinder due to the "Young effect." This spiralling movement in its turn produces a suction effect of water downwards, this leading to the formation of the depression 105 for accumulating hydrocarbon.

The cylinder 128 may, if so required, be surrounded by a fairing (not shown in FIG. 30) similar to the fairing 107 described hereinbefore.

FIG. 32 relates to a modified embodiment of a fluid-injecting nozzle, according to which the latter projects into a tangentially directed diffuser duct 132 immersed in the body of water 101 and supplied, on the one hand, with pressurised impelling fluid through the agency of a pipe 133 and, on the other hand, with water drawn into the said diffuser duct by said impelling fluid. By this means the whirling effect is reinforced in the heart of the body of water.

In all the cases just described, the supply of pressurised impelling fluid to the fluid-injecting nozzles may be continuous or in pulses.

FIGS. 33 and 33a relate to a further embodiment of the invention, according to which the whirling effect in the heart of the body of water is obtained by sucking water downwards by means of a pump 134. The latter is connected via a pipe 135 to an inlet manifold 136 which, through the agency of tangential nozzles 137, communicates with the body of water 101. In operation, jets of water are sucked tangentially into the manifold 136 by way of the nozzles 137, this generating in the body of water, as in the preceding case, a whirlpool producing a depression 105.

To obviate any possible interaction with the vortex-depression 105, it will be appropriate to provide for evacuation of water from the pump 134 at an adequate distance from said depression.

In the preceding description, mention has been made of a thin layer of light substance 2, 102 overfloating the surface of a body of liquid 1, 101. It is apparent that the method and apparatus according to the invention can "a fortiori" be employed in the case in which the said layer is not a thin one.

We claim:

1. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

fairing means having a geometrical axis which is identical with said vertical axis, said fairing means including a wall which laterally surrounds said whirling means and has a free upper edge which is maintained submerged below the surface of the body of liquid, said free upper edge being bent towards said axis; and means, distinct from said whirling means, for discriminatingly extracting from said depression the immiscible substance accumulated therein.

2. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

fairing means having a geometrical axis which is identical with said vertical axis, said fairing means including a wall which laterally surrounds said whirling means and has a free lower edge; and means, distinct from said whirling means, for discriminatingly extracting from said depression the immiscible substance accumulated therein.

3. An installation as claimed in claim 2, wherein said free lower edge is bent away from said axis.

4. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

a bottom surface arranged below said whirling means; and means, distinct from said whirling means, for discriminatingly extracting from said depression the immiscible substance accumulated therein.

5. An installation as claimed in claim 4, further comprising adjusting means for varying the distance between said bottom surface and said whirling means.

6. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

fairing means having a geometrical axis which is identical with said vertical axis, said fairing means including a wall which laterally surrounds said whirling means;

a bottom surface arranged below said whirling means; and means, distinct from said whirling means, for discriminatingly extracting from said depression the immiscible substance accumulated therein.

7. An installation as claimed in claim 6, wherein said bottom surface forms a bottom wall closing off the lower part of the fairing.

8. An installation as claimed in claim 7, wherein said fairing means is pierced, through the said bottom wall or in the vicinity thereof, by at least one orifice.

9. An installation as claimed in claim 6, wherein the wall which laterally surrounds said whirling means has a free lower edge, and said bottom surface is arranged below said free lower edge.

10. An installation as claimed in claim 9, further comprising adjusting means for varying the distance between said bottom surface and said free lower edge.

11. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

a convex deflecting wall submerged below the surface of the body of liquid and having a geometrical axis which is identical with said vertical axis;

and means, distinct from said whirling means, for discriminatingly extracting from said depression the immiscible substance accumulated therein.

12. An installation as claimed in claim 11, wherein the said convex deflecting wall forms part of a toroidal surface which surrounds said whirling means.

13. An installation as claimed in claim 11, further comprising a bottom surface arranged below said convex deflecting wall.

14. An installation as claimed in claim 13, further comprising adjusting means for varying the distance between said bottom surface and said convex deflecting wall.

15. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer, said whirling means including a hollow manifold structure bounded by a wall having the shape of a surface of revolution the geometrical axis of which is identical with said vertical axis, said hollow manifold structure being immersed in said body of liquid;

means for supplying said hollow manifold structure with pressurized impelling fluid; and at least one fluid-injecting nozzle carried by and fed from said hollow manifold structure, said fluid-injecting nozzle pointing in a direction having a tangential component with respect to said vertical axis whereby to discharge in said direction into said body of liquid a jet of impelling fluid;

and means, distinct from said whirling means, for discriminatingly extracting from said depression the immiscible substance accumulated therein.

16. An installation as claimed in claim 15, wherein the direction in which said fluid-injecting nozzle points has also a vertical downward component.

17. An installation as claimed in claim 15, wherein the means for supplying said hollow manifold structure with pressurized impelling fluid comprise at least one pipe which opens into said hollow structure, said pipe pointing in direction having a tangential component with respect to said vertical axis.

18. An installation as claimed in claim 17, wherein said direction has also a vertical downward component.

19. An installation as claimed in claim 15, comprising a plurality of fluid-injecting nozzles distributed over several coaxial circles of the said surface of revolution, with a degree of offset, passing from one circle to the next one, 20. An installation as claimed in claim 15, wherein said surface of revolution is a toroidal surface.

21. An installation as claimed in claim 15, wherein said surface of revolution is a cylinder.

22. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer, said whirling means including, immersed in said body of liquid, at least one fluid-injecting nozzle adapted to discharge into said body of liquid a jet of impelling fluid, and a diffuser duct whereinto said fluid-injecting nozzle projects, said nozzle and said duct both pointing in a direction having a tangential component with respect to said vertical axis; and means, distinct from said whirling means, for discriminatingly extracting from said depression the immiscible substance accumulated therein.

23. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer, said whirling means including, immersed in said body of liquid, at least one fluid-injecting nozzle pointing downwards and adapted to discharge into said body of liquid a jet of impelling fluid, and a diffuser duct whereinto said fluid-injecting nozzle projects, said diffuser duct having a geometrical axis which is identical with said vertical axis, said diffuser duct being fitted with at least one vane inclined in a direction having a tangential component with respect to said vertical axis; and means, distinct from said whirling means, for discriminatingly extracting from said depression the immiscible substance accumulated therein.

24. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer, said whirling means comprising at least one nozzle dipped into the body of liquid and pointing in a direction having a tangential component with respect to said vertical axis, and suction means for sucking, through said nozzle, liquid from said body of liquid; and means distinct from said whirling means, for discriminatingly extracting from said depression the immiscible substance accumulated therein.

25. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

means, distinct from said whirling means, for discriminatingly extracting from said depression the immiscible substance accumulated therein, said extracting means including a suction pipe connected to a suction means for said immiscible substance, said suction pipe having an intake opening adapted to engage a region of said depression located above the bottom of said depression; and at least one separating wall means disposed between the bottom of said depression and said intake opening.

26. An installation as claimed in claim 25, further comprising an auxiliary lateral wall which extends, in an upward direction, said separating wall, whereby to bound, in a portion of said depression, a settling chamber.

27. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer, said whirling means including rotary impeller means dipped down into said body of liquid and having a rotation axis which is identical with said vertical axis;

means, distinct from said whirling means, for discriminatingly extracting from said depression the immiscible substance accumulated therein, said extracting means including a suction pipe connected to a mechanically driven suction pump; and common motor means adapted to simultaneously drive said rotary impeller means and said suction pump.

28. An installation for removing and recovering from the surface of a body of liquid, an immiscible substance overfloating the same and spread thereover as a layer, said body of liquid and said layer of substance forming distinct horizontal strata, said installation comprising, in combination:

means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer; and means distinct from said whirling means, for discriminatingly extracting from said depression the immiscible substance accumulated therein, said extracting means including a filtering unit dipped down into said depression, and means for lifting up said filtering unit above said depression.

29. An installation for removing and recovering from the surface of a body of liquid, an immiscible substance overfloating the same and spread thereover as a layer, said body of liquid and said layer of substance forming distinct horizontal strata, said installation comprising, in combination:
means for locally whirling said liquid in the vicintiy of said surface about a substantially vertical axis to generate a whrilpool producing in said surface a depression of downwardly tapering closed-bottom cup-shaped outline into which said immiscible overfloating substance is centripetally drawn from the environment of said depression and accumulates in extra thickness compared with said layer;

a support for carrying said whirling means, said support floating on the body of liquid and comprising a boat of the catamaran type including two hulls arranged at a distance from one another and means interconnecting said two hulls whereby to bound together with said hulls a limited area at the surface of the body of liquid, said whirling means being immersed into said body of liquid within said limited area; and
means, distinct from said whirling means, for discriminatingly extracting from said depression the immiscible substance accumulated therein.

30. An installation as claimed in claim 29, wherein said interconnecting means comprise a paddle-wheel mounted for rotation about a substantially horizontal axis and engaging the layer of overfloating immiscible substance, whereby to allow, as the boat proceeds, said overfloating substance to penetrate into said limited area.

31. An installation for removing, and recovering from the surface of a body of liquid, an immiscible substance overfloating the same and spread thereover as a layer, said body of liquid and said layer of substance forming distinct horizontal strata, said installation comprising, in combination:
means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

a support for carrying said whirling means;
float means for maintaining said support above the surface of the body of liquid; and
means, distinct from said whirling means, for discriminatingly extracting from said depression the immiscible substance accumulated therein.

32. Installation as claimed in claim 31, wherein said float means comprise a plurality of floats each of which is positioned substantially according to a portion of a spiral about said vertical axis.

33. An installation for removing and recovering from the surface of a body of liquid, an immiscible substance overfloating the same and spread thereover as a layer, said body of liquid and said layer of substance forming distinct horizontal strata, said installation comprising, in combination:
means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer;

a support for carrying said whirling means;
anchoring means for keeping said support immersed in the body of liquid; and
means, distinct from said whirling means, for discriminatingly extracting from said depression the immiscible substance accumulated therein.

34. An installation for removing and recovering from the surface of a body of liquid an immiscible substance overfloating the same and spread thereover as a layer, said body of liquid and said layer of substance forming distinct horizontal strata, said installation including at least two units each of which comprises in combination:
means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer; and means, distinct from said whirling means, for discriminatingly extracting from said depression the immiscible substance accumulated therein.

35. An installation as claimed in claim 34, further comprising a common support for carrying said units.

36. An installation for removing and recovering from the surface of a body of liquid, an immiscible substance overfloating the same and spread thereover as a layer, said body of liquid and said layer of substance forming distinct horizontal strata, said installation comprising, in combination:
means for locally whirling said liquid in the vicinity of said surface about a substantially vertical axis to generate a whirlpool producing in said surface a depression of downwardly tapering closed-bottom cup-shaped outline into which said immiscible overfloating substance is centripetally drawn from the environment of said depression and accumulates in extra thickness compared with said layer; and
means, distinct from said whirling means, for discriminatingly extracting from said depression the immiscbile substance accumulated therein, said extracting means including a portion adapted to engage a region of said depression located above the bottom of said depression.

* * * * *